United States Patent
Zeng et al.

(10) Patent No.: US 9,823,773 B2
(45) Date of Patent: Nov. 21, 2017

(54) HANDHELD DEVICE AND METHOD FOR IMPLEMENTING INPUT AREA POSITION ADJUSTMENT ON HANDHELD DEVICE

(71) Applicant: Huawei Technologies Co., Ltd., Shenzhen (CN)

(72) Inventors: Xiangkai Zeng, Chengdu (CN); Zheng Ma, Shenzhen (CN); Lingjun Zhou, Hangzhou (CN); Jun Li, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 49 days.

(21) Appl. No.: 15/048,553

(22) Filed: Feb. 19, 2016

(65) Prior Publication Data

US 2016/0170559 A1 Jun. 16, 2016

Related U.S. Application Data

(63) Continuation of application No. PCT/CN2013/081874, filed on Aug. 20, 2013.

(51) Int. Cl.
*G06F 3/041* (2006.01)
*G06F 3/0488* (2013.01)
*G06F 3/0346* (2013.01)

(52) U.S. Cl.
CPC .......... *G06F 3/0416* (2013.01); *G06F 3/0346* (2013.01); *G06F 3/04883* (2013.01); *G06F 3/04886* (2013.01)

(58) Field of Classification Search
CPC .. G06F 3/0346; G06F 3/0416; G06F 3/04883; G06F 3/04886

(Continued)

(56) References Cited

U.S. PATENT DOCUMENTS

| 2007/0300182 A1 | 12/2007 | Bilow |
| 2009/0295743 A1 | 12/2009 | Nakajoh |
| 2011/0148779 A1 | 6/2011 | Abe et al. |

FOREIGN PATENT DOCUMENTS

| CN | 101916161 A | 12/2010 |
| CN | 102150118 A | 8/2011 |

(Continued)

OTHER PUBLICATIONS

Partial English Translation and Abstract of Chinese Patent Application No. CN101916161, Dec. 15, 2010, 7 pages.

(Continued)

*Primary Examiner* — Tony Davis
(74) *Attorney, Agent, or Firm* — Conley Rose, P.C.

(57) ABSTRACT

A handheld device and a method for implementing input area position adjustment on the handheld device includes, when detecting that a user executes a touch operation on a touchscreen of the handheld device, the handheld device determines, according to a relative position relationship between coordinates of contact points sensed by the touchscreen, whether the user executes the touch operation by a left hand or a right hand, and then, according to a result of the determining, displays, on a left side or a right side of the touchscreen, an input area that is currently displayed on the touchscreen, such that it is convenient for the user to perform inputting by one hand, thereby resolving a problem in the prior art that user operations are relatively cumbersome because a user needs to tap a specific touch area to implement input area position adjustment.

20 Claims, 7 Drawing Sheets

(58) Field of Classification Search
USPC .................................................. 345/170–176
See application file for complete search history.

(56) References Cited

FOREIGN PATENT DOCUMENTS

| | | |
|---|---|---|
| CN | 102479035 A | 5/2012 |
| CN | 102799268 A | 11/2012 |
| CN | 102810039 A | 12/2012 |
| CN | 103049118 A | 4/2013 |
| EP | 2469386 A1 | 6/2012 |

OTHER PUBLICATIONS

Foreign Communication From a Counterpart Application, Chinese Application No. 201380000894.8, Chinese Search Report dated Dec. 21, 2016, 3 pages.
Foreign Communication From a Counterpart Application, Chinese Application No. 201380000894.8, Chinese Office Action dated Dec. 28, 2016, 14 pages.
Partial English Translation and Abstract of Chinese Patent Application No. CN102479035, Jul. 18, 2016, 5 pages.
Partial English Translation and Abstract of Chinese Patent Application No. CN102799268, Jul. 18, 2016, 3 pages.
Foreign Communication From a Counterpart Application, PCT Application No. PCT/CN2013/081874, English Translation of International Search Report dated May 28, 2014, 2 pages.
Foreign Communication From a Counterpart Application, PCT Application No. PCT/CN2013/081874, English Translation of Written Opinion dated May 28, 2014, 6 pages.
Machine Translation and Abstract of Chinese Publication No. CN103049118, Apr. 17, 2013, 19 pages.
Foreign Communication From a Counterpart Application, Chinese Application No. 201380000894.8, Chinese Search Report dated Jul. 13, 2017, 2 pages.
Foreign Communication From a Counterpart Application, Chinese Application No. 201380000894.8, Chinese Office Action dated Jul. 21, 2017, 16 pages.

HANDHELD DEVICE AND METHOD FOR IMPLEMENTING INPUT AREA POSITION ADJUSTMENT ON HANDHELD DEVICE

CROSS-REFERENCE TO RELATED APPLICATIONS

This application is a continuation of International Application No. PCT/CN2013/081874, filed on Aug. 20, 2013, which is hereby incorporated by reference in its entirety.

TECHNICAL FIELD

Embodiments of the present disclosure relate to the field of electronic technologies, and in particular, to a handheld device and a method for implementing input area position adjustment on the handheld device.

BACKGROUND

As handheld devices (such as mobile phones and tablet computers) with touchscreens play an increasingly important role in peoples' lives, sizes of the touchscreens also grow, which enhances users' visual experience, but brings much inconvenience to the users at the same time because finger stretching lengths cannot cover an entire touch area in a case in which the users operate by one hand. For example, when an input area (such as an input area of an input method or an input area of an unlock application) is displayed on a left side of a handheld device, if a user is used to operating by the right hand, it is inconvenient for one-hand input.

In the prior art shown in FIG. 1, when an input area is located on a right side of a touchscreen (as shown in a right-hand keyboard area in FIG. 1), if a user intends to perform inputting by the left hand, the user taps a "keyboard switching area", in order to enable the input area to be displayed on a left side of the touchscreen (as shown by a left-hand keyboard area in FIG. 1), such that it is convenient to perform inputting by the left hand. Similarly, when the input area is located on the left side of the touchscreen, if the user intends to perform inputting by only the right hand, the user taps the "keyboard switching area", in order to enable the input area to be displayed on the right side of the touchscreen, such that it is convenient to perform inputting by only the right hand.

According to the prior art, a user is required to tap a specific touch area to implement input area position adjustment, resulting in cumbersome user operations and poor experience.

SUMMARY

Embodiments of the present disclosure provide a handheld device and a method for implementing input area position adjustment on the handheld device, to resolve a problem in the prior art that user operations are relatively cumbersome because a user needs to tap a specific touch area to implement input area position adjustment.

According to a first aspect, a handheld device is provided, where the handheld device includes a touchscreen, a touch area feature identifying module, and a display driving module. The touchscreen is configured to, when detecting that a user executes a touch operation on the touchscreen of the handheld device, send coordinates of contact points sensed by the touchscreen to the touch area feature identifying module. The touch area feature identifying module is configured to receive, from the touchscreen, the coordinates of the contact points sensed by the touchscreen, calculate a relative position relationship between the contact points according to the coordinates of the contact points sensed by the touchscreen, in order to determine whether an upper end of a touch area corresponding to the touch operation tilts left or right relative to a lower end. If the calculated relative position relationship indicates that the upper end of the touch area tilts right relative to the lower end, determine that the user executes the touch operation by the left hand, or if the calculated relative position relationship indicates that the upper end of the touch area tilts left relative to the lower end, determine that the user executes the touch operation by the right hand, and send a result of the determining to the display driving module. The display driving module is configured to receive the result of the determining from the touch area feature identifying module, and when the result of the determining is that the user executes the touch operation by the left hand, display, on a left side of the touchscreen, an input area that is currently displayed on the handheld device, or when the result of the determining is that the user executes the touch operation by the right hand, display, on a right side of the touchscreen, an input area that is currently displayed on the handheld device.

In a first possible implementation manner of the first aspect, the touch area feature identifying module is further configured to receive, from the touchscreen, the coordinates of the contact points sensed by the touchscreen, where the coordinates of the contact points sensed by the touchscreen include coordinates of a highest point of the touch area corresponding to the touch operation and coordinates of a lowest point of the touch area corresponding to the touch operation, calculate a relative position relationship between the highest point and the lowest point according to the coordinates of the highest point and the coordinates of the lowest point, if the highest point is located upper right to the lowest point, determine that the user executes the touch operation by the left hand, or if the highest point of the touch area is located upper left to the lowest point, determine that the user executes the touch operation by the right hand, and send a result of the determining to the display driving module.

With reference to the first possible implementation manner of the first aspect, in a second possible implementation manner, the touch area feature identifying module is configured to calculate a relative position relationship between the highest point and the lowest point according to the coordinates of the highest point and the coordinates of the lowest point, and if the highest point is located upper right to the lowest point, determine that the user executes the touch operation by the left hand, or if the highest point of the touch area is located upper left to the lowest point, determine that the user executes the touch operation by the right hand. The touch area feature identifying module is configured to acquire a difference by subtracting a horizontal coordinate value of the lowest point from a horizontal coordinate value of the highest point, and if the difference is greater than a first threshold, determine that the user executes the touch operation by the left hand, or if the difference is less than a second threshold, determine that the user executes the touch operation by the right hand, where a lower left corner of the touchscreen is a coordinate origin, a horizontal coordinate axis is horizontally rightward, a vertical coordinate axis is vertically upward, the first threshold is greater than or equal to 0, and the second threshold is less than or equal to 0, or the touch area feature identifying module is further configured to calculate, using the coordinates of the highest point and the coordinates of the lowest point, a slope of a straight line on which the highest point and the lowest point are located, and if the slope is greater than a third threshold, determine that the user executes the touch operation by the left hand, or if the slope is less than a fourth threshold, determine that the user executes the touch operation by the right hand, where a lower left corner of the touchscreen is a coordinate origin, a horizontal coordinate axis is horizontally rightward, a vertical coordinate axis is vertically upward, the third threshold is greater than or equal to 0, and the fourth threshold is less than or equal to 0.

In a third possible implementation manner of the first aspect, the touch area feature identifying module is further configured to receive, from the touchscreen, the coordinates of the contact points sensed by the touchscreen, where the coordinates of the contact points sensed by the touchscreen include coordinates of a leftmost point of the touch area corresponding to the touch operation and coordinates of a rightmost point of the touch area corresponding to the touch operation, calculate a relative position relationship between the leftmost point and the rightmost point according to the coordinates of the leftmost point and the coordinates of the rightmost point, and if the leftmost point is below the rightmost point, determine that the user executes the touch operation by the left hand, or if the leftmost point of the touch area is above the rightmost point, determine that the user executes the touch operation by the right hand.

With reference to the third possible implementation manner of the first aspect, in a fourth possible implementation manner, the touch area feature identifying module is configured to calculate a relative position relationship between the leftmost point and the rightmost point according to the coordinates of the leftmost point and the coordinates of the rightmost point, and if the leftmost point is below the rightmost point, determine that the user executes the touch operation by the left hand, or if the leftmost point of the touch area is above the rightmost point, determine that the user executes the touch operation by the right hand. The touch area feature identifying module is configured to acquire a difference by subtracting a vertical coordinate value of the leftmost point from a vertical coordinate value of the rightmost point. If the difference is greater than a first threshold, determine that the user executes the touch operation by the left hand, or if the difference is less than a second threshold, determine that the user executes the touch operation by the right hand, where the first threshold is greater than or equal to 0, and the second threshold is less than or equal to 0, and send a result of the determining to the display driving module, or the touch area feature identifying module is further configured to calculate, using the coordinates of the leftmost point and the coordinates of the rightmost point, a slope of a straight line on which the leftmost point and the rightmost point are located, and if the slope is greater than a third threshold, determine that the user executes the touch operation by the left hand, or if the slope is less than a fourth threshold, determine that the user executes the touch operation by the right hand, where the third threshold is greater than 0, and the fourth threshold is less than or equal to 0.

With reference to the first aspect, or any one of the first to the fourth possible implementation manners of the first aspect, in a fifth possible implementation manner, the display driving module is further configured to determine an application that is in an active state and that is on the handheld device, and to display, on a left side of the touchscreen, an input area that is currently displayed on the handheld device further includes, if a position of a currently displayed input area of the application in the active state is adjustable, the display driving module is configured to display, on the left side of the touchscreen, the currently displayed input area of the application in the active state, or that the display driving module is configured to display, on a right side of the touchscreen, an input area that is currently displayed on the handheld device, further includes, if a position of a currently displayed input area of the application in the active state is adjustable, the display driving module is configured to display, on the right side of the touchscreen, the currently displayed input area of the application in the active state.

With reference to the first aspect, or any one of the first to the fifth possible implementation manners of the first aspect, in a sixth possible implementation manner, the input area is an input area of an input method application or an input area of an unlock application.

According to a second aspect, a method for implementing input area position adjustment on a handheld device is provided, where the method includes, when detecting that a user executes a touch operation on a touchscreen of the handheld device, acquiring, by the handheld device, coordinates of contact points sensed by the touchscreen, calculating, by the handheld device, a relative position relationship between the contact points according to the coordinates of the contact points sensed by the touchscreen, in order to determine whether an upper end of a touch area corresponding to the touch operation tilts left or right relative to a lower end. If the calculated relative position relationship indicates that the upper end of the touch area tilts right relative to the lower end, determining that the user executes the touch operation by the left hand, or if the calculated relative position relationship indicates that the upper end of the touch area tilts left relative to the lower end, determining that the user executes the touch operation by the right hand. When it is determined that the user executes the touch operation by the left hand, displaying, on a left side of the touchscreen, an input area that is currently displayed on the handheld device, or when it is determined that the user executes the touch operation by the right hand, displaying, on a right side of the touchscreen, an input area that is currently displayed on the handheld device.

In a first possible implementation manner of the second aspect, the coordinates of the contact points sensed by the touchscreen include coordinates of a highest point of the touch area corresponding to the touch operation and coordinates of a lowest point of the touch area corresponding to the touch operation, and the calculating, by the handheld device, a relative position relationship between the contact points according to the coordinates of the contact points sensed by the touchscreen, in order to determine whether an upper end of a touch area corresponding to the touch operation tilts left or right relative to a lower end. If the calculated relative position relationship indicates that the upper end of the touch area tilts right relative to the lower end, determining that the user executes the touch operation by the left hand, or if the calculated relative position relationship indicates that the upper end of the touch area tilts left relative to the lower end, determining that the user executes the touch operation by the right hand further includes calculating, by the handheld device, a relative position relationship between the highest point and the lowest point according to the coordinates of the highest point and the coordinates of the lowest point, and if the highest point is located upper right to the lowest point, determining that the user executes the touch operation by the left hand, or if the highest point of the touch area is located upper left to the lowest point, determining that the user executes the touch operation by the right hand.

With reference to the first possible implementation manner of the second aspect, in a second possible implementation manner, the calculating a relative position relationship between the highest point and the lowest point according to the coordinates of the highest point and the coordinates of the lowest point. If the highest point is located upper right to the lowest point, determining that the user executes the touch operation by the left hand, or if the highest point of the touch area is located upper left to the lowest point, determining that the user executes the touch operation by the right hand further includes acquiring a difference by subtracting a horizontal coordinate value of the lowest point from a horizontal coordinate value of the highest point, and if the difference is greater than a first threshold, determining that the user executes the touch operation by the left hand, or if the difference is less than a second threshold, determining that the user executes the touch operation by the right hand, where the first threshold is greater than or equal to 0, and the second threshold is less than or equal to 0, or calculating, using the coordinates of the highest point and the coordinates of the lowest point, a slope of a straight line on which the highest point and the lowest point are located, and if the slope is greater than a third threshold, determining that the user executes the touch operation by the left hand, or if the slope is less than a fourth threshold, determining that the user executes the touch operation by the right hand, where the third threshold is greater than or equal to 0, and the fourth threshold is less than or equal to 0.

In a third possible implementation manner of the second aspect, the coordinates of the contact points sensed by the touchscreen include coordinates of a leftmost point of the touch area corresponding to the touch operation and coordinates of a rightmost point of the touch area corresponding to the touch operation, and the calculating, by the handheld device, a relative position relationship between the contact points according to the coordinates of the contact points sensed by the touchscreen, in order to determine whether an upper end of a touch area corresponding to the touch operation tilts left or right relative to a lower end, and if the calculated relative position relationship indicates that the upper end of the touch area tilts right relative to the lower end, determining that the user executes the touch operation by the left hand, or if the calculated relative position relationship indicates that the upper end of the touch area tilts left relative to the lower end, determining that the user executes the touch operation by the right hand further includes, calculating, by the handheld device, a relative position relationship between the leftmost point and the rightmost point according to the coordinates of the leftmost point and the coordinates of the rightmost point, and if the leftmost point is below the rightmost point, determining that the user executes the touch operation by the left hand, or if the leftmost point of the touch area is above the rightmost point, determining that the user executes the touch operation by the right hand.

With reference to the third possible implementation manner of the second aspect, in a fourth possible implementation manner, the calculating a relative position relationship between the leftmost point and the rightmost point according to the coordinates of the leftmost point and the coordinates of the rightmost point, and if the leftmost point is below the rightmost point, determining that the user executes the touch operation by the left hand, or if the leftmost point of the touch area is above the rightmost point, determining that the user executes the touch operation by the right hand further includes acquiring a difference by subtracting a vertical coordinate value of the leftmost point from a vertical coordinate value of the rightmost point, and if the difference is greater than first threshold, determining that the user executes the touch operation by the left hand, or if the difference is less than a second threshold, determining that the user executes the touch operation by the right hand, where the first threshold is greater than or equal to 0, and the second threshold is less than or equal to 0, or calculating, using the coordinates of the leftmost point and the coordinates of the rightmost point, a slope of a straight line on which the leftmost point and the rightmost point are located, and if the slope is greater than a third threshold, determining that the user executes the touch operation by the left hand, or if the slope is less than a fourth threshold, determining that the user executes the touch operation by the right hand, where the third threshold is greater than 0, and the fourth threshold is less than or equal to 0.

With reference to the second aspect, or any one of the first to the fourth possible implementation manners of the second aspect, in a fifth possible implementation manner, before the displaying, on a left side of the touchscreen, an input area that is currently displayed on the handheld device or the displaying, on a right side of the touchscreen, an input area that is currently displayed on the handheld device, the method further includes determining an application that is in an active state and that is on the handheld device, and the displaying, on a left side of the touchscreen, an input area that is currently displayed on the handheld device. If a position of a currently displayed input area of the application in the active state is adjustable, displaying, on the left side of the touchscreen, the currently displayed input area of the application in the active state, or the displaying, on a right side of the touchscreen, an input area that is currently displayed on the handheld device. If a position of a currently displayed input area of the application in the active state is adjustable, displaying, on the right side of the touchscreen, the currently displayed input area of the application in the active state.

With reference to the second aspect, or any one of the first to the fifth possible implementation manners of the second aspect, in a sixth possible implementation manner, the input area is an input area of an input method application or an input area of an unlock application.

According to a third aspect, a handheld device is provided, where the handheld device includes a touchscreen, a processor, an integrated circuit bus, and a video graphics array interface. The touchscreen and the processor are connected using the integrated circuit bus and the video graphics array interface. The touchscreen is configured to, when detecting that a user executes a touch operation on the touchscreen of the handheld device, send, using the integrated circuit bus, coordinates of contact points sensed by the touchscreen to the processor, and the processor is configured to calculate a relative position relationship between the contact points according to the coordinates of the contact points sensed by the touchscreen, in order to determine whether an upper end of a touch area corresponding to the touch operation tilts left or right relative to a lower end, and if the calculated relative position relationship indicates that the upper end of the touch area tilts right relative to the lower end, determine that the user executes the touch operation by the left hand, or if the calculated relative position relationship indicates that the upper end of the touch area tilts left relative to the lower end, determine that the user executes the touch operation by the right hand. The processor is further configured to, when it is determined that the user executes the touch operation by the left hand, display, using the video graphics array interface and on a left side of the touchscreen, an input area that is currently displayed on the handheld device, or when it is determined that the user executes the touch operation by the right hand, display, using the video graphics array interface and on a right side of the touchscreen, an input area that is currently displayed on the handheld device.

In a first possible implementation manner of the third aspect, the coordinates of the contact points sensed by the touchscreen include coordinates of a highest point of the touch area corresponding to the touch operation and coordinates of a lowest point of the touch area corresponding to the touch operation, and the processor is further configured to calculate a relative position relationship between the highest point and the lowest point according to the coordinates of the highest point and the coordinates of the lowest point, and if the highest point is located upper right to the lowest point, determine that the user executes the touch operation by the left hand, or if the highest point of the touch area is located upper left to the lowest point, determine that the user executes the touch operation by the right hand. The processor is further configured to, when determining that the user executes the touch operation by the left hand, display the input area on the left side of the touchscreen using the video graphics array interface, or when determining that the user executes the touch operation by the right hand, display the input area on the right side of the touchscreen using the video graphics array interface.

With reference to the first possible implementation manner of the third aspect, in a second possible implementation manner, the processor is configured to calculate a relative position relationship between the highest point and the lowest point according to the coordinates of the highest point and the coordinates of the lowest point, and if the highest point is located upper right to the lowest point, determine that the user executes the touch operation by the left hand, or if the highest point of the touch area is located upper left to the lowest point, determine that the user executes the touch operation by the right hand. The processor is configured to acquire a difference by subtracting a horizontal coordinate value of the lowest point from a horizontal coordinate value of the highest point, and if the difference is greater than a first threshold, determine that the user executes the touch operation by the left hand, or if the difference is less than a second threshold, determine that the user executes the touch operation by the right hand, where a lower left corner of the touchscreen is a coordinate origin, a horizontal coordinate axis is horizontally rightward, a vertical coordinate axis is vertically upward, the first threshold is greater than or equal to 0, and the second threshold is less than or equal to 0, or the processor is configured to calculate, using the coordinates of the highest point and the coordinates of the lowest point, a slope of a straight line on which the highest point and the lowest point are located, and if the slope is greater than a third threshold, determine that the user executes the touch operation by the left hand, or if the slope is less than a fourth threshold, determine that the user executes the touch operation by the right hand, where a lower left corner of the touchscreen is a coordinate origin, a horizontal coordinate axis is horizontally rightward, a vertical coordinate axis is vertically upward, the third threshold is greater than or equal to 0, and the fourth threshold is less than or equal to 0.

In a third possible implementation manner of the third aspect, the coordinates of the contact points sensed by the touchscreen include coordinates of a leftmost point of the touch area corresponding to the touch operation and coordinates of a rightmost point of the touch area corresponding to the touch operation, and the processor is further configured to calculate a relative position relationship between the leftmost point and the rightmost point according to the coordinates of the leftmost point and the coordinates of the rightmost point, and if the leftmost point is below the rightmost point, determine that the user executes the touch operation by the left hand, or if the leftmost point of the touch area is above the rightmost point, determine that the user executes the touch operation by the right hand. The processor is further configured to, when determining that the user executes the touch operation by the left hand, instruct the touchscreen to display the input area on the left side of the touchscreen, or when determining that the user executes the touch operation by the right hand, instruct the touchscreen to display the input area on the right side of the touchscreen.

With reference to the third possible implementation manner of the third aspect, in a fourth possible implementation manner, the processor is configured to calculate a relative position relationship between the leftmost point and the rightmost point according to the coordinates of the leftmost point and the coordinates of the rightmost point, and if the leftmost point is below the rightmost point, determine that the user executes the touch operation by the left hand, or if the leftmost point of the touch area is above the rightmost point, determine that the user executes the touch operation by the right hand. The processor is configured to acquire a difference by subtracting a vertical coordinate value of the leftmost point from a vertical coordinate value of the rightmost point, if the difference is greater than a first threshold, determine that the user executes the touch operation by the left hand, or if the difference is less than a second threshold, determine that the user executes the touch operation by the right hand, where a lower left corner of the touchscreen is a coordinate origin, a horizontal coordinate axis is horizontally rightward, a vertical coordinate axis is vertically upward, the first threshold is greater than or equal to 0, and the second threshold is less than or equal to 0, or the processor is configured to calculate, using the coordinates of the leftmost point and the coordinates of the rightmost point, a slope of a straight line on which the leftmost point and the rightmost point are located, and if the slope is greater than a third threshold, determine that the user executes the touch operation by the left hand, or if the slope is less than a fourth threshold, determine that the user executes the touch operation by the right hand, where a lower left corner of the touchscreen is a coordinate origin, a horizontal coordinate axis is horizontally rightward, a vertical coordinate axis is vertically upward, the third threshold is greater than 0, and the fourth threshold is less than or equal to 0.

With reference to the third aspect, or any one of the first to the fourth possible implementation manners of the third aspect, in a fifth possible implementation manner, the processor is further configured to determine an application that is in an active state and that is on the handheld device, and the processor is configured to display, on a left side of the touchscreen, an input area that is currently displayed on the handheld device further includes, if a position of a currently displayed input area of the application in the active state is adjustable, the processor is configured to display, on the left side of the touchscreen, the currently displayed input area of the application in the active state, or the processor is configured to display, on a right side of the touchscreen, an input area that is currently displayed on the handheld device further includes, if a position of a currently displayed input area of the application in the active state is adjustable, the processor is configured to display, on the right side of the touchscreen, the currently displayed input area of the application in the active state.

With reference to the third aspect, or any one of the first to the fifth possible implementation manners of the third aspect, in a sixth possible implementation manner, the input area is an input area of an input method application or an input area of an unlock application.

According to a fourth aspect, a computer program product is provided, where the computer program product includes computer program code, and when the computer program code is executed by a computer, the computer program code may enable the computer to execute a step of the second aspect or any one of the first to the sixth possible implementation manners of the second aspect.

According to a fifth aspect, a computer readable storage medium is provided, where the computer readable storage medium includes computer program code, and when the computer program code is executed by a computer, the computer program code may enable the computer to execute a step of the second aspect or any one of the first to the sixth possible implementation manners of the second aspect.

According to the embodiments of the present disclosure, when detecting that a user executes a touch operation on a touchscreen of a handheld device, the handheld device determines, according to a relative position relationship between coordinates of contact points sensed by the touchscreen, whether the user executes the touch operation by the left hand or the right hand, and then, according to a result of the determining, displays, on a left side or a right side of the touchscreen, an input area that is currently displayed on the touchscreen, such that it is convenient for the user to perform inputting by one hand, thereby resolving a problem in the prior art that user operations are relatively cumbersome because a user needs to tap a specific touch area to implement input area position adjustment.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
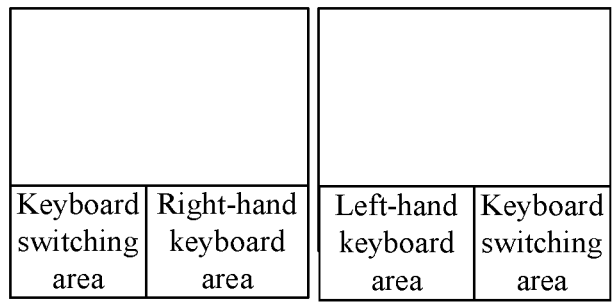
FIG. 1 is a schematic diagram of input area position adjustment.
Figure 2:
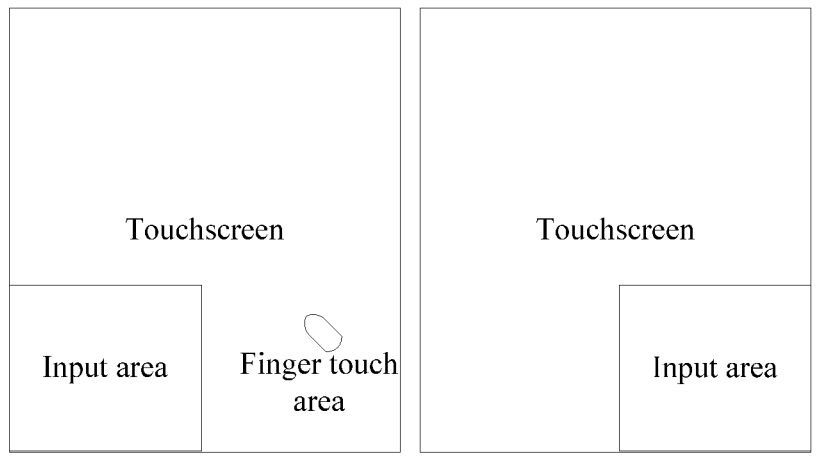
FIG. 2 shows schematic diagrams of input area position adjustment according to an embodiment of the present disclosure.

FIG. 2 shows schematic diagrams of input area position adjustment according to an embodiment of the present disclosure.

As shown in a left diagram in FIG. 2, if a current input area is on a left side of a touchscreen of a handheld device, it is convenient for left-hand input. When a user operates the handheld device by one hand, and touches any area of the touchscreen by a finger, the handheld device determines, according to a feature of the touch area, whether the user executes the touch operation by the left hand or the right hand. If it is determined that the touch operation is executed by the right hand, the input area is displayed on a right side of the touchscreen (as shown in a right diagram in FIG. 2).

Figure 3:
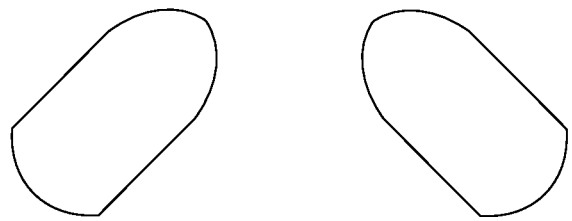
FIG. 3, FIG. 4A, and FIG. 4B are schematic diagrams of a finger touch area according to an embodiment of the present disclosure.

A left diagram and a right diagram in FIG. 3 are a schematic diagram of a left-hand touch area and a schematic diagram of a right-hand touch area according to an embodiment of the present disclosure, respectively. As shown in the left diagram in FIG. 3, a feature of the left-hand touch area may be indicated as an upper end of the touch area tilts right relative to a lower end. As shown in the right diagram in FIG. 3, a feature of the right-hand touch area may be indicated as an upper end of the touch area tilts left relative to a lower end.

Figure 4A:
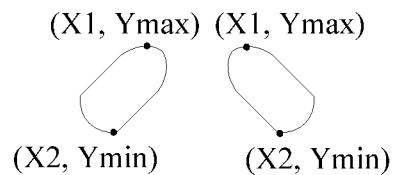

As shown in FIG. 4A, coordinates of a highest point of the touch area is (X1, Ymax), and coordinates of a lowest point is (X2, Ymin). That an upper end of the touch area tilts right relative to a lower end may be further indicated as the highest point (X1, Ymax) of the touch area is located upper right to the lowest point (X2, Ymin). An upper end of the touch area tilts left relative to a lower end may be further indicated as the highest point (X1, Ymax) of the touch area is located upper left to the lowest point (X2, Ymin).

Figure 4B:
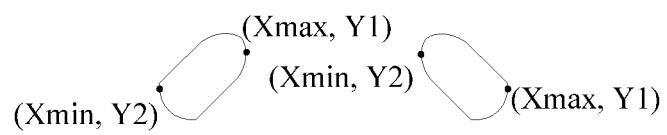

As shown in FIG. 4B, coordinates of a leftmost point of the touch area is (Xmin, Y2), and coordinates of a rightmost point is (Xmax, Y1). That an upper end of the touch area tilts right relative to a lower end may be further indicated as the rightmost point (Xmax, Y1) of the touch area is above the leftmost point (Xmin, Y2). That an upper end of the touch area tilts left relative to a lower end may be further indicated as the leftmost point (Xmin, Y2) of the touch area is above the rightmost point (Xmax, Y1).

Figure 5:
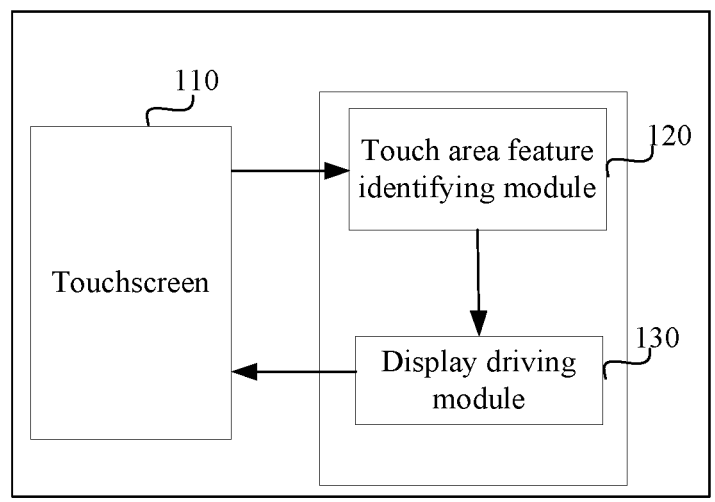
FIG. 5 is a schematic structural diagram of a handheld device according to Embodiment 1 of the present disclosure.

FIG. 5 is a schematic structural diagram of a handheld device according to Embodiment 1 of the present disclosure.

The handheld device may be further a mobile phone, a tablet computer, or the like.

The handheld device includes a touchscreen 110, a touch area feature identifying module 120, and a display driving module 130. The touchscreen 110 may further include a display screen and a touchpad.

The touchscreen 110 is configured to, when detecting that a user executes a touch operation on the touchscreen 110, send coordinates of contact points sensed by the touchscreen 110 to the touch area feature identifying module 120.

The touch area feature identifying module 120 is configured to receive, from the touchscreen 110, the coordinates of the contact points sensed by the touchscreen 110, calculate a relative position relationship between the contact points according to the coordinates of the contact points sensed by the touchscreen 110, in order to determine whether an upper end of a touch area corresponding to the touch operation tilts left or right relative to a lower end, if the calculated relative position relationship indicates that the upper end of the touch area tilts right relative to the lower end, determine that the user executes the touch operation by the left hand, or if the calculated relative position relationship indicates that the upper end of the touch area tilts left relative to the lower end, determine that the user executes the touch operation by the right hand, and send a result of the determining to the display driving module 130.

The display driving module 130 is configured to receive the result of the determining from the touch area feature identifying module 120, and when the result of the determining is that the user executes the touch operation by the left hand, display, on a left side of the touchscreen 110, an input area that is currently displayed on the handheld device, or when the result of the determining is that the user executes the touch operation by the right hand, display, on a right side of the touchscreen 110, an input area that is currently displayed on the handheld device. That the display driving module 130 displays, on the left side or the right side of the touchscreen 110, the input area that is currently displayed on the handheld device may be further implemented as follows: a generated operation interface including the input area is transmitted to the touchscreen 110 and displayed, where the input area is located on a left side or a right side of the operation interface.

Figure 6:
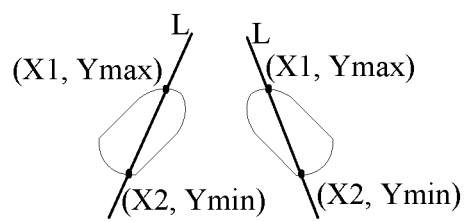
FIG. 6 and FIG. 7 are schematic diagrams of a straight line on which a highest point of a finger touch area and a lowest point of the finger touch area are located according to Embodiment 1 of the present disclosure.

With reference to FIG. 4A, FIG. 5, and FIG. 6, the following describes in detail implementation manner 1 of Embodiment 1 of the present disclosure.

The touchscreen 110 is configured to, when detecting that the user executes the touch operation on the touchscreen 110, send the coordinates of the contact points sensed by the touchscreen 110 to the touch area feature identifying module 120, where the coordinates of the contact points sensed by the touchscreen 110 include coordinates of a highest point of the touch area corresponding to the touch operation and coordinates of a lowest point of the touch area corresponding to the touch operation, for example, (X1, Ymax) and (X2, Ymin) shown in FIG. 4A.

The touch area feature identifying module 120 is configured to receive, from the touchscreen 110, the coordinates of the contact points sensed by the touchscreen 110, and calculate a relative position relationship between the highest point and the lowest point according to the coordinates of the highest point and the coordinates of the lowest point, if the highest point is located upper right to the lowest point, as shown in the left diagram in FIG. 4A, determine that the user executes the touch operation by the left hand, or if the highest point of the touch area is located upper left to the lowest point, as shown in the right diagram in FIG. 4A, determine that the user executes the touch operation by the right hand.

It should be noted that, if the coordinates that are of the contact points sensed by the touchscreen 110 and that are received by the touch area feature identifying module 120 from the touchscreen 110 include not only the coordinates of the highest point and the coordinates of the lowest point but also coordinates of another contact point in the touch area.

The touch area feature identifying module 120 is further configured to identify the coordinates of the highest point and the coordinates of the lowest point according to vertical coordinate values of all the received coordinates, and then, calculate the relative position relationship between the highest point and the lowest point according to the coordinates of the highest point and the coordinates of the lowest point.

The display driving module 130 is configured to receive the result of the determining from the touch area feature identifying module 120, and when the result of the determining is that the user executes the touch operation by the left hand, display the input area on the left side of the touchscreen 110, or when the result of the determining is that the user executes the touch operation by the right hand, display the input area on the right side of the touchscreen 110. That the display driving module 130 displays the input area on the left side or the right side of the touchscreen 110 may be further implemented as follows: the generated operation interface including the input area is transmitted to the touchscreen 110 and displayed, where the input area is located on the left side or the right side of the operation interface.

Furthermore, the touch area feature identifying module 120 may calculate the relative position relationship between the highest point and the lowest point in multiple manners, and the following provides two exemplary implementation manners.

Exemplary implementation manner 1: As shown in FIG. 4A, a difference is acquired by subtracting a horizontal coordinate value X2 of the lowest point from a horizontal coordinate value X1 of the highest point. If the difference is greater than a first threshold, it is determined that the user executes the touch operation by the left hand, or if the difference is less than a second threshold, it is determined that the user executes the touch operation by the right hand, where a lower left corner of the touchscreen is a coordinate origin, a horizontal coordinate axis is horizontally rightward, a vertical coordinate axis is vertically upward, the first threshold is greater than or equal to 0, and the second threshold is less than or equal to 0. During specific implementation, both the first threshold and the second threshold may be set to 0, or the first threshold may be set to a value greater than 0, and the second threshold may be set to a value less than 0.

Exemplary implementation manner 2: As shown in FIG. 6, a slope of a straight line (for example, straight line L shown in FIG. 6) on which the highest point and the lowest point are located is calculated using the coordinates of the highest point and the coordinates of the lowest point. If the slope is greater than a third threshold, it is determined that the user executes the touch operation by the left hand, or if the slope is less than a fourth threshold, it is determined that the user executes the touch operation by the right hand, where a lower left corner of the touchscreen is a coordinate origin, a horizontal coordinate axis is horizontally rightward, a vertical coordinate axis is vertically upward, the third threshold is greater than or equal to 0, and the fourth threshold is less than or equal to 0. During specific implementation, both the third threshold and the fourth threshold may be set to 0, or the third threshold may be set to a value greater than 0, and the fourth threshold may be set to a value less than 0.

Figure 7:
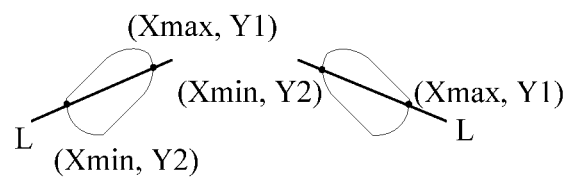

With reference to FIG. 4B, FIG. 5, and FIG. 7, the following describes in detail implementation manner 2 of Embodiment 1 of the present disclosure.

The touchscreen 110 is configured to, when detecting that the user executes the touch operation on the touchscreen of the handheld device, send the coordinates of the contact points sensed by the touchscreen 110 to the touch area feature identifying module 120, where the coordinates of the contact points sensed by the touchscreen 110 include coordinates of a leftmost point of the touch area corresponding to the touch operation and coordinates of a rightmost point of the touch area corresponding to the touch operation, for example, (Xmax, Y1) and (Xmin, Y2) shown in FIG. 4B.

The touch area feature identifying module 120 is configured to receive, from the touchscreen 110, the coordinates of the contact points sensed by the touchscreen 110, calculate a relative position relationship between the leftmost point and the rightmost point according to the coordinates of the leftmost point and the coordinates of the rightmost point, and if the leftmost point is below the rightmost point, as shown in the left diagram in FIG. 4B, determine that the user executes the touch operation by the left hand, or if the leftmost point of the touch area is above the rightmost point, as shown in the right diagram in FIG. 4B, determine that the user executes the touch operation by the right hand.

It should be noted that, if the coordinates that are of the contact points sensed by the touchscreen 110 and that are received by the touch area feature identifying module 120 from the touchscreen 110 include not only the coordinates of the leftmost point and the coordinates of the rightmost point but also coordinates of another contact point in the touch area. The touch area feature identifying module 120 is further configured to identify the coordinates of the leftmost point and the coordinates of the rightmost point according to horizontal coordinate values of all the received coordinates, and then, calculate the relative position relationship between the leftmost point and the rightmost point according to the coordinates of the leftmost point and the coordinates of the rightmost point.

Specific implementation of the display driving module 130 and the touchscreen 110 is similar to specific implementation of the display driving module 130 and the touchscreen 110 in implementation manner 1, and is not repeatedly described herein.

Furthermore, the touch area feature identifying module 120 may calculate the relative position relationship between the leftmost point and the rightmost point in multiple manners, and the following provides two exemplary implementation manners.

Exemplary implementation manner 1: As shown in FIG. 4B, a difference is acquired by subtracting a vertical coordinate value Y2 of the leftmost point from a vertical coordinate value Y1 of the rightmost point. If the difference is greater than a first threshold, it is determined that the user executes the touch operation by the left hand, or if the difference is less than a second threshold, it is determined that the user executes the touch operation by the right hand, where a lower left corner of the touchscreen is a coordinate origin, a horizontal coordinate axis is horizontally rightward, a vertical coordinate axis is vertically upward, the first threshold is greater than or equal to 0, and the second threshold is less than or equal to 0. During specific implementation, both the first threshold and the second threshold may be set to 0, or the first threshold may be set to a value greater than 0, and the second threshold may be set to a value less than 0.

Exemplary implementation manner 2: As shown in FIG. 7, a slope of a straight line (for example, straight line L shown in FIG. 7) on which the leftmost point and the rightmost point are located is calculated using the coordinates of the leftmost point and the coordinates of the rightmost point. If the slope is greater than a third threshold, it is determined that the user executes the touch operation by the left hand, or if the slope is less than a fourth threshold, it is determined that the user executes the touch operation by the right hand, where a lower left corner of the touchscreen is a coordinate origin, a horizontal coordinate axis is horizontally rightward, a vertical coordinate axis is vertically upward, the third threshold is greater than 0, and the fourth threshold is less than or equal to 0. During specific implementation, both the third threshold and the fourth threshold may be set to 0, or the third threshold may be set to a value greater than 0, and the fourth threshold may be set to a value less than 0.

The input area in Embodiment 1 of the present disclosure may be an input area of an input method application (for example, an input method keyboard) or an input area of an unlock application.

The display driving module 130 may be further configured to determine an application that is in an active state and that is on the handheld device, for example, an input method application. If a position of a currently displayed input area of the application in the active state is adjustable (using an input method application as an example, a position of a currently displayed input method keyboard of the input method application in the active state is adjustable), that the display driving module 130 displays, on the left side or the right side of the touchscreen 110. The input area that is currently displayed on the handheld device is further: the display driving module 130 displays, on the left side or the right side of the touchscreen, the currently displayed input area of the application in the active state.

During specific implementation, the touch area feature identifying module 120 and the display driving module 130 that are in the handheld device may be implemented in an application in which the input area is located, for example, be implemented in an input method application or be implemented in an unlock application. When the application is in an active state, and the user executes the touch operation on the touchscreen 110, the handheld device successively invokes the touch area feature identifying module 120 and the display driving module 130. Therefore, when the display driving module 130 is invoked, it may be determined that the application currently in the active state is an application that implements the display driving module 130, and then the currently displayed input area of the application is displayed on the left side or the right side of the touchscreen.

During specific implementation, the touch area feature identifying module 120 and the display driving module 130 that are in the handheld device may not be implemented in an application in which the input area is located, for example, be implemented in an independent application on the handheld device, where the application operates in a background after being started. When the application operates in the background, and the user executes the touch operation on the touchscreen 110, the handheld device successively invokes the touch area feature identifying module 120 and the display driving module 130. When the display driving module 130 is invoked, an application in an active state (for example, an input method application) is acquired by invoking a function of an operating system, and it is determined, by invoking a function of the operating system, that a position of a currently displayed input area of the application in the active state is adjustable, and then the currently displayed input area of the application is displayed on the left side or the right side of the touchscreen.

According to Embodiment 1 of the present disclosure, when detecting that a user executes a touch operation on a touchscreen of a handheld device, the handheld device determines, according to a relative position relationship between coordinates of contact points sensed by the touchscreen, whether the user executes the touch operation by the left hand or the right hand, and then, according to a result of the determining, displays, on a left side or a right side of the touchscreen, an input area that is currently displayed on the touchscreen, such that it is convenient for the user to perform inputting by one hand, thereby resolving a problem in the prior art that user operations are relatively cumbersome because a user needs to tap a specific touch area to implement input area position adjustment.

Figure 8:
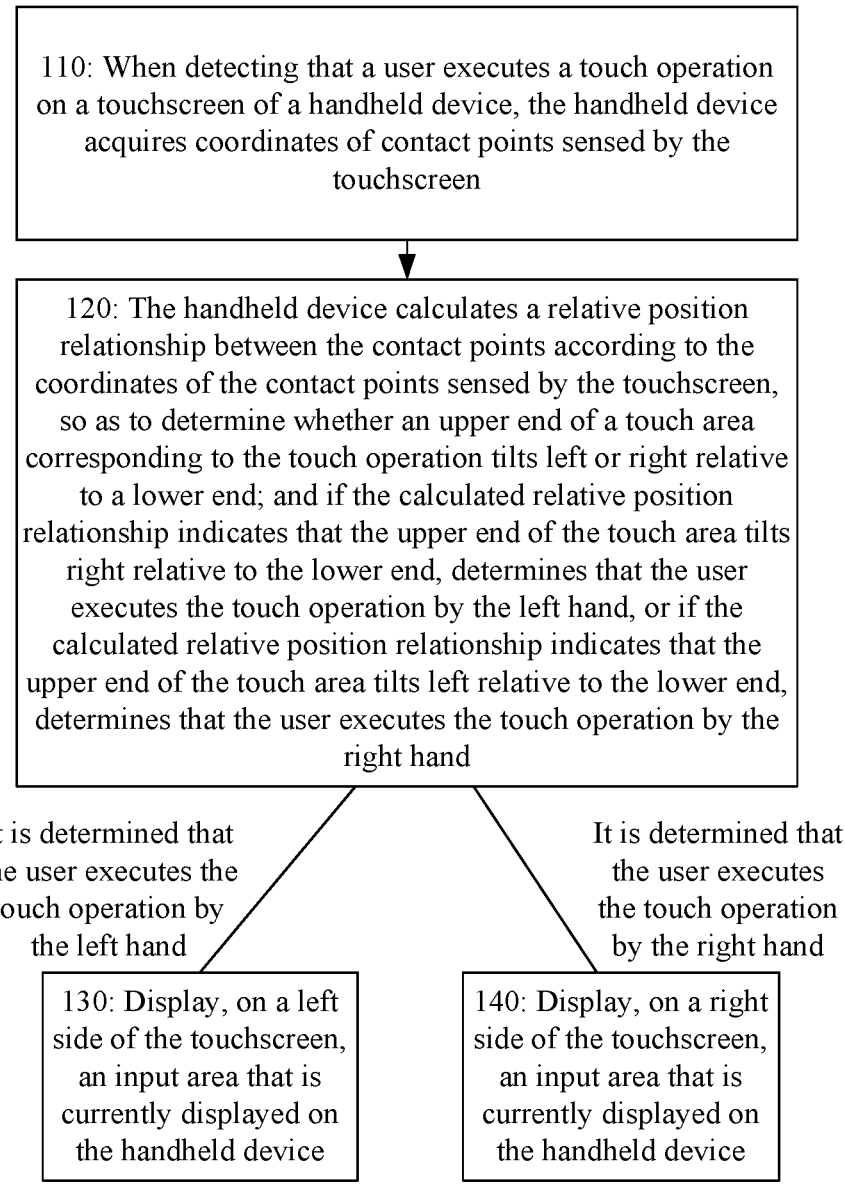
FIG. 8, FIG. 9A, and FIG. 9B are schematic flowcharts of a method according to Embodiment 2 of the present disclosure.

As shown in FIG. 8, Embodiment 2 of the present disclosure provides a method for implementing input area position adjustment on a handheld device.

Step 110: When detecting that a user executes a touch operation on a touchscreen of the handheld device, the handheld device acquires coordinates of contact points sensed by the touchscreen.

Step 120: The handheld device calculates a relative position relationship between the contact points according to the coordinates of the contact points sensed by the touchscreen, in order to determine whether an upper end of a touch area corresponding to the touch operation tilts left or right relative to a lower end, and if the calculated relative position relationship indicates that the upper end of the touch area tilts right relative to the lower end, determines that the user executes the touch operation by the left hand, or if the calculated relative position relationship indicates that the upper end of the touch area tilts left relative to the lower end, determines that the user executes the touch operation by the right hand.

If it is determined that the user executes the touch operation by the left hand, step 130 is executed, or if it is determined that the user executes the touch operation by the right hand, step 140 is executed.

Step 130: Display, on a left side of the touchscreen, an input area that is currently displayed on the handheld device.

Step 140: Display, on a right side of the touchscreen, an input area that is currently displayed on the handheld device.

In steps 130 and 140, the input area may be displayed on the left side or the right side of the touchscreen by invoking an input area display function of an operating system, where an input parameter of the input area display function is coordinates of a lower left corner of an area in which the input area is to be displayed.

Figure 9A:
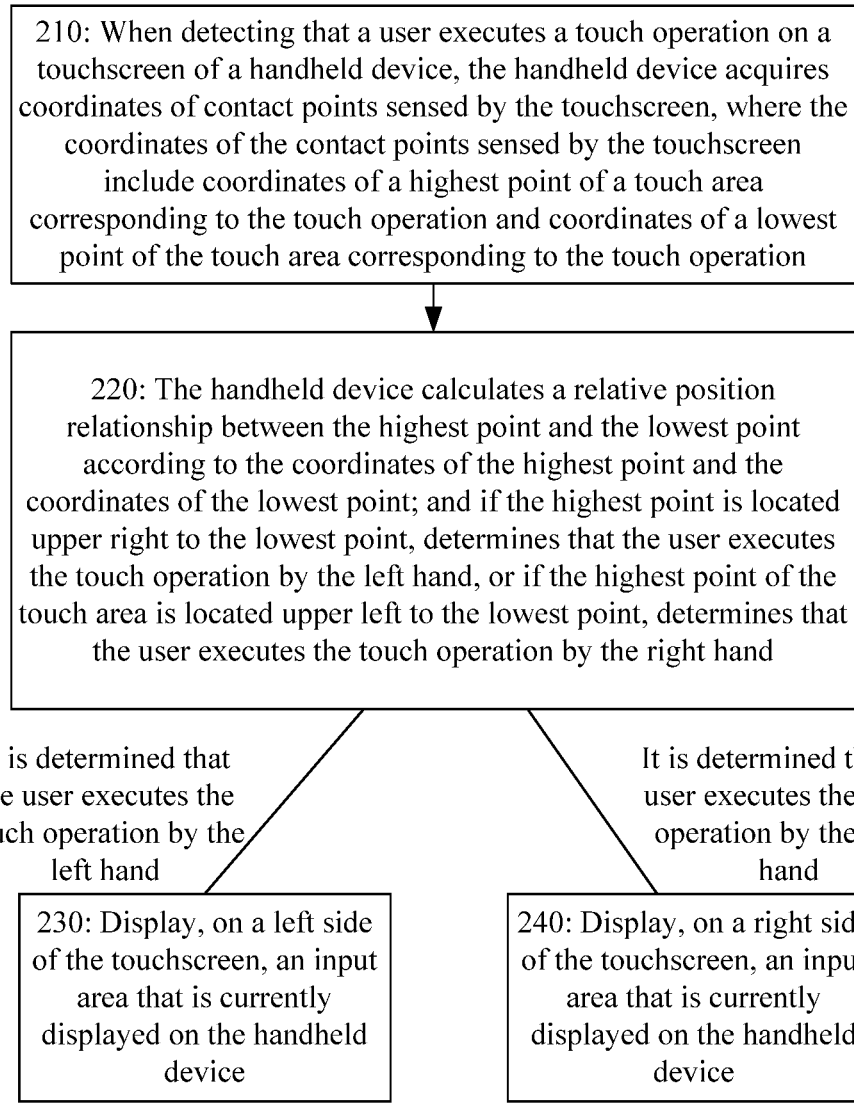
Figure 9B:
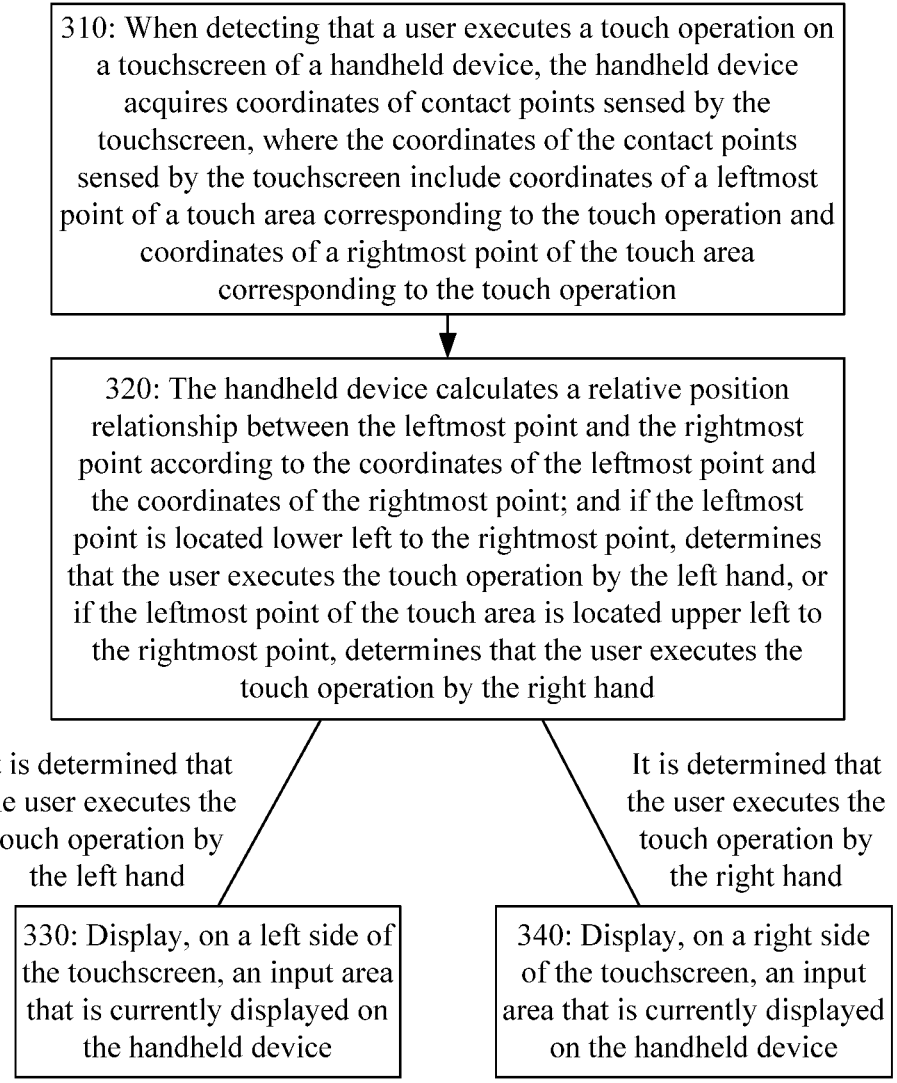

FIG. 9A and FIG. 9B are schematic method flowcharts of two implementation manners according to Embodiment 2 of the present disclosure.

With reference to FIG. 9A, the following describes in detail implementation manner 1 of Embodiment 2 of the present disclosure.

Step 210: When detecting that a user executes a touch operation on a touchscreen of the handheld device, the handheld device acquires coordinates of contact points sensed by the touchscreen, where the coordinates of the contact points sensed by the touchscreen include coordinates of a highest point of a touch area corresponding to the touch operation and coordinates of a lowest point of the touch area corresponding to the touch operation.

Step 220: The handheld device calculates a relative position relationship between the highest point and the lowest point according to the coordinates of the highest point and the coordinates of the lowest point, and if the highest point is located upper right to the lowest point, determines that the user executes the touch operation by the left hand, or if the highest point of the touch area is located upper left to the lowest point, determines that the user executes the touch operation by the right hand.

In step 220, the relative position relationship between the highest point and the lowest point may be further calculated in multiple manners, and specific implementation manners are similar to those in implementation manner 1 of Embodiment 1 and are not repeatedly described herein.

If it is determined that the user executes the touch operation by the left hand, step 230 is executed, or if it is determined that the user executes the touch operation by the right hand, step 240 is executed.

Step 230: Display, on a left side of the touchscreen, an input area that is currently displayed on the handheld device.

Step 240: Display, on a right side of the touchscreen, an input area that is currently displayed on the handheld device.

In steps 230 and 240, the input area may be displayed on the left side or the right side of the touchscreen by invoking an input area display function of an operating system, where an input parameter of the input area display function is coordinates of a lower left corner of an area in which the input area is to be displayed.

With reference to FIG. 9B, the following describes in detail implementation manner 2 of Embodiment 2 of the present disclosure.

Step 310: When detecting that a user executes a touch operation on a touchscreen of the handheld device, the handheld device acquires coordinates of contact points sensed by the touchscreen, where the coordinates of the contact points sensed by the touchscreen include coordinates of a leftmost point of a touch area corresponding to the touch operation and coordinates of a rightmost point of the touch area corresponding to the touch operation.

Step 320: The handheld device calculates a relative position relationship between the leftmost point and the rightmost point according to the coordinates of the leftmost point and the coordinates of the rightmost point, and if the leftmost point is below the rightmost point, determines that the user executes the touch operation by the left hand, or if the leftmost point of the touch area is above the rightmost point, determines that the user executes the touch operation by the right hand.

In step 320, the relative position relationship between the leftmost point and the rightmost point may be further calculated in multiple manners, and specific implementation manners are similar to those in implementation manner 2 of Embodiment 1 and are not repeatedly described herein.

If it is determined that the user executes the touch operation by the left hand, step 330 is executed, or if it is determined that the user executes the touch operation by the right hand, step 340 is executed.

Steps 330 and 340 are similar to steps 230 and 240 and are not repeatedly described.

The input area in Embodiment 2 of the present disclosure may be an input area of an input method application or an input area of an unlock application.

Before the displaying, on a left side or a right side of the touchscreen, an input area that is currently displayed on the handheld device, the method may further include determining an application that is in an active state and that is on the handheld device (for example, an input method application). If a position of a currently displayed input area of the application in the active state is adjustable (using an input method application as an example, a position of a currently displayed input method keyboard of the input method application in the active state is adjustable), the displaying, on a left side or a right side of the touchscreen, an input area that is currently displayed on the handheld device further includes displaying, on the left side or the right side of the touchscreen, the currently displayed input area of the application in the active state.

During specific implementation, the method for implementing input area position adjustment on the handheld device may be implemented in an application in which the input area is located, for example, be implemented in an input method application or be implemented in an unlock application. When the application is in an active state, and the user executes the touch operation on the touchscreen, the steps of the method for implementing input area position adjustment are successively executed. Therefore, before the step of the displaying, on a left side or a right side of the touchscreen, an input area that is currently displayed on the handheld device is executed, it may be determined that the application currently in the active state is an application that implements the method, and then the currently displayed input area of the application is displayed on the left side or the right side of the touchscreen.

During specific implementation, the method for implementing input area position adjustment on the handheld device may not be implemented in an application in which the input area is located, for example, be implemented in an independent application on the handheld device, where the application operates in a background after being started. When the application operates in the background, and the user executes the touch operation on the touchscreen, the handheld device successively executes the steps of the method for implementing input area position adjustment. Before the step of the displaying, on a left side or a right side of the touchscreen, an input area that is currently displayed on the handheld device is executed, an application in an active state (for example, an input method application) is acquired by invoking a function of an operating system, and it is determined, by invoking a function of the operating system, that a position of a currently displayed input area of the application in the active state is adjustable, and then the currently displayed input area of the application is displayed on the left side of the right side of the touchscreen.

According to Embodiment 2 of the present disclosure, when detecting that a user executes a touch operation on a touchscreen of a handheld device, the handheld device determines, according to a relative position relationship between coordinates of contact points sensed by the touchscreen, whether the user executes the touch operation by the left hand or the right hand, and then, according to a result of the determining, displays, on a left side or a right side of the touchscreen, an input area that is currently displayed on the touchscreen, such that it is convenient for the user to perform inputting by one hand, thereby resolving a problem in the prior art that user operations are relatively cumbersome because a user needs to tap a specific touch area to implement input area position adjustment.

Figure 10:
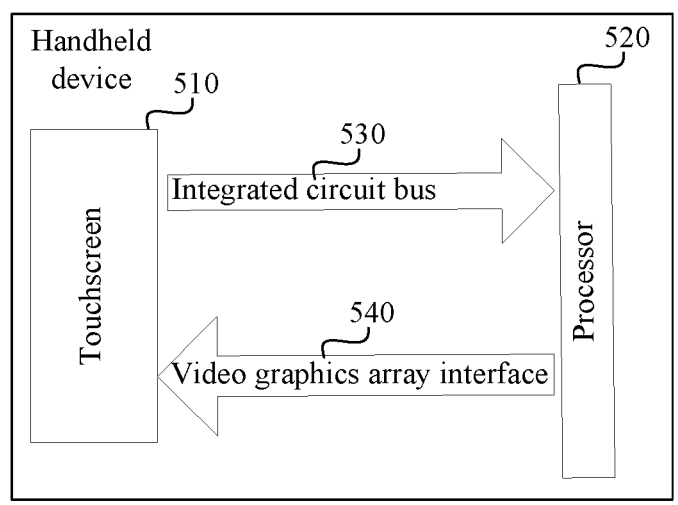
FIG. 10 is another schematic structural diagram of a handheld device according to Embodiment 3 of the present disclosure.

FIG. 10 is another schematic structural diagram of a handheld device according to Embodiment 3 of the present disclosure.

The handheld device may be a mobile phone, a tablet computer, or the like.

The handheld device includes a touchscreen 510, a processor 520, an integrated circuit bus 530, and a video graphics array interface 540, where the touchscreen 510 and the processor 520 are connected using the integrated circuit bus 530 and the video graphics array interface 540. The integrated circuit bus 530 is used by the touchscreen 510 to transmit a touch signal, for example, coordinates of contact points sensed by the touchscreen 510, to the processor 520, and the video graphics array interface 540 is used by the processor 520 to transmit display information, for example, an operation interface including an input area, to the touchscreen 510.

The touchscreen 510 is configured to, when detecting that a user executes a touch operation on the touchscreen of the handheld device, send, using the integrated circuit bus 530, the coordinates of the contact points sensed by the touchscreen 510 to the processor 520.

The processor 520 is configured to calculate a relative position relationship between the contact points according to the coordinates of the contact points sensed by the touchscreen 510, in order to determine whether an upper end of a touch area corresponding to the touch operation tilts left or right relative to a lower end, and if the calculated relative position relationship indicates that the upper end of the touch area tilts right relative to the lower end, determine that the user executes the touch operation by the left hand, or if the calculated relative position relationship indicates that the upper end of the touch area tilts left relative to the lower end, determine that the user executes the touch operation by the right hand. The processor 520 is further configured to, when determining that the user executes the touch operation by the left hand, display, using the video graphics array interface 540 and on a left side of the touchscreen 510, an input area that is currently displayed on the handheld device, or when determining that the user executes the touch operation by the right hand, display, using the video graphics array interface 540 and on a right side of the touchscreen 510, an input area that is currently displayed on the handheld device. That the processor 520 displays the input area on the left side or the right side of the touchscreen 510 using the video graphics array interface 540 may be further implemented as follows: a generated operation interface including the input area is transmitted to the touchscreen 510 using the video graphics array interface 540 and displayed, where the input area is located on a left side or a right side of the operation interface.

In a specific implementation manner:

The touchscreen 510 is configured to, when detecting that a user executes a touch operation on the touchscreen of the handheld device, send, using the integrated circuit bus 530, coordinates of contact points sensed by the touchscreen 510 to the processor 520, where the coordinates of the contact points sensed by the touchscreen 510 include coordinates of a highest point of a touch area corresponding to the touch operation and coordinates of a lowest point of the touch area corresponding to the touch operation.

The processor 520 is configured to calculate a relative position relationship between the highest point and the lowest point according to the coordinates of the highest point and the coordinates of the lowest point, and if the highest point is located upper right to the lowest point, determine that the user executes the touch operation by the left hand, or if the highest point of the touch area is located upper left to the lowest point, determine that the user executes the touch operation by the right hand. The processor 520 is further configured to, when determining that the user executes the touch operation by the left hand, display the input area on the left side of the touchscreen 510 using the video graphics array interface 540, or when determining that the user executes the touch operation by the right hand, display the input area on the right side of the touchscreen 510 using the video graphics array interface 540. That the processor 510 displays the input area on the left side or the right side of the touchscreen 510 using the video graphics array interface 540 may be further implemented as follows:

a generated operation interface including the input area is transmitted to the touchscreen 510 using the video graphics array interface 540 and displayed, where the input area is located on a left side or a right side of the operation interface.

Furthermore, the processor 520 may calculate the relative position relationship between the highest point and the lowest point in multiple manners, and the following provides two exemplary implementation manners: exemplary implementation manner 1: a difference is acquired by subtracting a horizontal coordinate value of the lowest point from a horizontal coordinate value of the highest point. If the difference is greater than a first threshold, it is determined that the user executes the touch operation by the left hand, or if the difference is less than a second threshold, it is determined that the user executes the touch operation by the right hand, where a lower left corner of the touchscreen is a coordinate origin, a horizontal coordinate axis is horizontally rightward, a vertical coordinate axis is vertically upward, the first threshold is greater than or equal to 0, and the second threshold is less than or equal to 0, or exemplary implementation manner 2: a slope of a straight line on which the highest point and the lowest point are located is calculated using the coordinates of the highest point and the coordinates of the lowest point. If the slope is greater than a third threshold, it is determined that the user executes the touch operation by the left hand, or if the slope is less than a fourth threshold, it is determined that the user executes the touch operation by the right hand, where a lower left corner of the touchscreen is a coordinate origin, a horizontal coordinate axis is horizontally rightward, a vertical coordinate axis is vertically upward, the third threshold is greater than or equal to 0, and the fourth threshold is less than or equal to 0.

In another specific implementation manner:

The touchscreen 510 is configured to, when detecting that a user executes a touch operation on the touchscreen of the handheld device, send coordinates of contact points sensed by the touchscreen 510 to the processor 520, where the coordinates of the contact points sensed by the touchscreen 510 include coordinates of a leftmost point of a touch area corresponding to the touch operation and coordinates of a rightmost point of the touch area corresponding to the touch operation.

The processor 520 is configured to calculate a relative position relationship between the leftmost point and the rightmost point according to the coordinates of the leftmost point and the coordinates of the rightmost point, and if the leftmost point is below the rightmost point, determine that the user executes the touch operation by the left hand, or if the leftmost point of the touch area is above the rightmost point, determine that the user executes the touch operation by the right hand. The processor 520 is further configured to, when determining that the user executes the touch operation by the left hand, instruct the touchscreen 510 to display the input area on the left side of the touchscreen, or when determining that the user executes the touch operation by the right hand, instruct the touchscreen to display the input area on the right side of the touchscreen.

Furthermore, the processor 520 may calculate the relative position relationship between the leftmost point and the rightmost point in multiple manners, and the following provides two exemplary implementation manners: exemplary implementation manner 1: a difference is acquired by subtracting a vertical coordinate value of the leftmost point from a vertical coordinate value of the rightmost point. If the difference is greater than a first threshold, it is determined that the user executes the touch operation by the left hand, or if the difference is less than a second threshold, it is determined that the user executes the touch operation by the right hand, where a lower left corner of the touchscreen is a coordinate origin, a horizontal coordinate axis is horizontally rightward, a vertical coordinate axis is vertically upward, the first threshold is greater than or equal to 0, and the second threshold is less than or equal to 0, or exemplary implementation manner 2: a slope of a straight line on which the leftmost point and the rightmost point are located is calculated using the coordinates of the leftmost point and the coordinates of the rightmost point. If the slope is greater than a third threshold, it is determined that the user executes the touch operation by the left hand, or if the slope is less than a fourth threshold, it is determined that the user executes the touch operation by the right hand, where a lower left corner of the touchscreen is a coordinate origin, a horizontal coordinate axis is horizontally rightward, a vertical coordinate axis is vertically upward, the third threshold is greater than 0, and the fourth threshold is less than or equal to 0.

The input area in Embodiment 3 of the present disclosure may be an input area of an input method application or an input area of an unlock application.

Before the processor 520 displays, on the left side or the right side of the touchscreen, the input area that is currently displayed on the handheld device, the processor 520 may further determine an application that is in an active state and that is on the handheld device (for example, an input method application). If a position of a currently displayed input area of the application in the active state is adjustable (using an input method application as an example, a position of a currently displayed input method keyboard of the input method application in the active state is adjustable), the displaying, on the left side or the right side of the touchscreen, the input area that is currently displayed on the handheld device further includes displaying, on the left side or the right side of the touchscreen, the currently displayed input area of the application in the active state.

According to Embodiment 3 of the present disclosure, when detecting that a user executes a touch operation on a touchscreen of a handheld device, the handheld device determines, according to a relative position relationship between coordinates of contact points sensed by the touchscreen, whether the user executes the touch operation by the left hand or the right hand, and then, according to a result of the determining, displays, on a left side or a right side of the touchscreen, an input area that is currently displayed on the touchscreen, such that it is convenient for the user to perform inputting by one hand, thereby resolving a problem in the prior art that user operations are relatively cumbersome because a user needs to tap a specific touch area to implement input area position adjustment.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A handheld device, wherein the handheld device comprises:
    a touchscreen;
    a processor;
    an integrated circuit bus; and
    a video graphics array interface,
    wherein the touchscreen and the processor are connected using the integrated circuit bus and the video graphics array interface,
    wherein the touchscreen is configured to send, using the integrated circuit bus, coordinates of contact points sensed by the touchscreen to the processor when a user executes a touch operation on the touchscreen of the handheld device, and
    wherein the processor is configured to:
        calculate a relative position relationship between the contact points according to the coordinates of the contact points sensed by the touchscreen in order to determine whether an upper end of a touch area corresponding to the touch operation tilts left or right relative to a lower end;
        determine that the user executes the touch operation by a left hand when the calculated relative position relationship indicates that the upper end of the touch area tilts right relative to the lower end;
        determine that the user executes the touch operation by a right hand when the calculated relative position relationship indicates that the upper end of the touch area tilts left relative to the lower end;
        display, using the video graphics array interface and on a left side of the touchscreen, an input area that is currently displayed on the handheld device when the user executes the touch operation by the left hand; and
        display, using the video graphics array interface and on a right side of the touchscreen, the input area that is currently displayed on the handheld device when the user executes the touch operation by the right hand.

2. The handheld device according to claim 1, wherein the coordinates of the contact points sensed by the touchscreen comprise coordinates of a highest point of the touch area corresponding to the touch operation and coordinates of a lowest point of the touch area corresponding to the touch operation, wherein the processor being configured to calculate the relative position relationship between the contact points comprises the processor being configured to calculate the relative position relationship between the highest point and the lowest point according to the coordinates of the highest point and the coordinates of the lowest point, wherein the processor being configured to determine that the user executes the touch operation by the left hand comprises the processor being configured to determine that the user executes the touch operation by the left hand when the highest point is located upper right to the lowest point, and wherein the processor being configured to determine that the user executes the touch operation by the right hand comprises the processor being configured to determine that the user executes the touch operation by the right hand when the highest point of the touch area is located upper left to the lowest point.

3. The handheld device according to claim 2, wherein the processor being configured to calculate a relative position relationship between the highest point and the lowest point according to the coordinates of the highest point and the coordinates of the lowest point, determine that the user executes the touch operation by the left hand when the highest point is located upper right to the lowest point, and determine that the user executes the touch operation by the right hand when the highest point of the touch area is located upper left to the lowest point comprises the processor being configured to:
    acquire a difference by subtracting a horizontal coordinate value of the lowest point from a horizontal coordinate value of the highest point;
    determine that the user executes the touch operation by the left hand when the difference is greater than a first threshold; and determine that the user executes the touch operation by the right hand when the difference is less than a second threshold, and wherein a lower left corner of the touchscreen is a coordinate origin, a horizontal coordinate axis is horizontally rightward, a vertical coordinate axis is vertically upward, the first threshold is greater than or equal to 0, and the second threshold is less than or equal to 0.

4. The handheld device according to claim 2, wherein the processor being configured to calculate a relative position relationship between the highest point and the lowest point according to the coordinates of the highest point and the coordinates of the lowest point, determine that the user executes the touch operation by the left hand when the highest point is located upper right to the lowest point, and determine that the user executes the touch operation by the right hand when the highest point of the touch area is located upper left to the lowest point comprises the processor being configured to:

calculate, using the coordinates of the highest point and the coordinates of the lowest point, a slope of a straight line on which the highest point and the lowest point are located;

determine that the user executes the touch operation by the left hand when the slope is greater than a third threshold; and determine that the user executes the touch operation by the right hand when the slope is less than a fourth threshold, and wherein a lower left corner of the touchscreen is a coordinate origin, a horizontal coordinate axis is horizontally rightward, a vertical coordinate axis is vertically upward, the third threshold is greater than or equal to 0, and the fourth threshold is less than or equal to 0.

5. The handheld device according to claim 1, wherein the coordinates of the contact points sensed by the touchscreen comprise coordinates of a leftmost point of the touch area corresponding to the touch operation and coordinates of a rightmost point of the touch area corresponding to the touch operation, wherein the processor being configured to calculate the relative position relationship between the contact points comprises the processor being configured to calculate the relative position relationship between the leftmost point and the rightmost point according to the coordinates of the leftmost point and the coordinates of the rightmost point, wherein the processor being configured to determine that the user executes the touch operation by the left hand comprises the processor being configured to determine that the user executes the touch operation by the left hand when the leftmost point is below the rightmost point, and wherein the processor being configured to determine that the user executes the touch operation by the right hand comprises the processor being configured to determine that the user executes the touch operation by the right hand when the leftmost point of the touch area is above the rightmost point.

6. The handheld device according to claim 5, wherein the processor being configured to calculate the relative position relationship between the leftmost point and the rightmost point according to the coordinates of the leftmost point and the coordinates of the rightmost point, determine that the user executes the touch operation by the left hand when the leftmost point is below the rightmost point, and determine that the user executes the touch operation by the right hand when the leftmost point of the touch area is above the rightmost point comprises the processor being configured to:

acquire a difference by subtracting a vertical coordinate value of the leftmost point from a vertical coordinate value of the rightmost point;

determine that the user executes the touch operation by the left hand when the difference is greater than a first threshold; and determine that the user executes the touch operation by the right hand when the difference is less than a second threshold, and wherein a lower left corner of the touchscreen is a coordinate origin, a horizontal coordinate axis is horizontally rightward, a vertical coordinate axis is vertically upward, the first threshold is greater than or equal to 0, and the second threshold is less than or equal to 0.

7. The handheld device according to claim 5, wherein the processor being configured to calculate the relative position relationship between the leftmost point and the rightmost point according to the coordinates of the leftmost point and the coordinates of the rightmost point, determine that the user executes the touch operation by the left hand when the leftmost point is below the rightmost point, and determine that the user executes the touch operation by the right hand when the leftmost point of the touch area is above the rightmost point comprises the processor being configured to:

calculate, using the coordinates of the leftmost point and the coordinates of the rightmost point, a slope of a straight line on which the leftmost point and the rightmost point are located;

determine that the user executes the touch operation by the left hand when the slope is greater than a third threshold; and determine that the user executes the touch operation by the right hand when the slope is less than a fourth threshold, and wherein a lower left corner of the touchscreen is a coordinate origin, a horizontal coordinate axis is horizontally rightward, a vertical coordinate axis is vertically upward, the third threshold is greater than 0, and the fourth threshold is less than or equal to 0.

8. The handheld device according to claim 1, wherein the processor is further configured to determine an application that is in an active state and that is on the handheld device, wherein the processor being configured to display, on the left side of the touchscreen, the input area that is currently displayed on the handheld device comprises the processor being configured to display, on the left side of the touchscreen, a currently displayed input area of the application in the active state when a position of the currently displayed input area of the application in the active state is adjustable, and wherein the processor being configured to display, on the right side of the touchscreen, the input area that is currently displayed on the handheld device comprises the processor being configured to display, on the right side of the touchscreen, a currently displayed input area of the application in the active state when a position of the currently displayed input area of the application in the active state is adjustable.

9. The handheld device according to claim 1, wherein the input area is an input area of an input method application.

10. The handheld device according to claim 1, wherein the input area is an input area of an unlock application.

11. A handheld device, wherein the handheld device comprises:
a touchscreen;
a touch area feature identifier; and
a display driver, wherein the touchscreen, the touch area feature identifier, and the display driver are connected to each other, wherein the touchscreen is configured to send coordinates of contact points sensed by the touchscreen to the touch area feature identifier when a user executes a touch operation on the touchscreen of the handheld device, wherein the touch area feature identifier is configured to:
receive, from the touchscreen, the coordinates of the contact points sensed by the touchscreen;
calculate a relative position relationship between the contact points according to the coordinates of the contact points sensed by the touchscreen, in order to determine whether an upper end of a touch area corresponding to the touch operation tilts left or right relative to a lower end;
determine that the user executes the touch operation by a left hand when the calculated relative position relationship indicates that the upper end of the touch area tilts right relative to the lower end;
determine that the user executes the touch operation by a right hand when the calculated relative position relationship indicates that the upper end of the touch area tilts left relative to the lower end; and
send a result of the determining to the display driver, and wherein the display driver is configured to:
receive the result of the determining from the touch area feature identifier;
display, on a left side of the touchscreen, an input area that is currently displayed on the handheld device when the user executes the touch operation by the left hand; and
display, on a right side of the touchscreen, the input area that is currently displayed on the handheld device when the user executes the touch operation by the right hand.

12. A method for implementing input area position adjustment on a handheld device, wherein the method comprises:
acquiring, by the handheld device, coordinates of contact points sensed by a touchscreen when a user executes a touch operation on the touchscreen of the handheld device;
calculating, by the handheld device, a relative position relationship between the contact points according to the coordinates of the contact points sensed by the touchscreen, in order to determine whether an upper end of a touch area corresponding to the touch operation tilts left or right relative to a lower end;
determining that the user executes the touch operation by a left hand when the calculated relative position relationship indicates that the upper end of the touch area tilts right relative to the lower end;
determining that the user executes the touch operation by a right hand when the calculated relative position relationship indicates that the upper end of the touch area tilts left relative to the lower end;
displaying, on a left side of the touchscreen, an input area that is currently displayed on the handheld device when the user executes the touch operation by the left hand; and
displaying, on a right side of the touchscreen, the input area that is currently displayed on the handheld device when the user executes the touch operation by the right hand.

13. The method according to claim 12, wherein the coordinates of the contact points sensed by the touchscreen comprise coordinates of a highest point of the touch area corresponding to the touch operation and coordinates of a lowest point of the touch area corresponding to the touch operation, wherein calculating, by the handheld device, the relative position relationship between the contact points comprises calculating, by the handheld device, the relative position relationship between the highest point and the lowest point according to the coordinates of the highest point and the coordinates of the lowest point, wherein determining that the user executes the touch operation by the left hand comprises determining that the user executes the touch operation by the left hand when the highest point is located upper right to the lowest point, and wherein determining that the user executes the touch operation by the right hand comprises determining that the user executes the touch operation by the right hand when the highest point of the touch area is located upper left to the lowest point.

14. The method according to claim 13, wherein calculating the relative position relationship between the highest point and the lowest point according to the coordinates of the highest point and the coordinates of the lowest point, determining that the user executes the touch operation by the left hand when the highest point is located upper right to the lowest point, and determining that the user executes the touch operation by the right hand when the highest point of the touch area is located upper left to the lowest point, comprise:
acquiring a difference by subtracting a horizontal coordinate value of the lowest point from a horizontal coordinate value of the highest point;
determining that the user executes the touch operation by the left hand when the difference is greater than a first threshold; and
determining that the user executes the touch operation by the right hand when the difference is less than a second threshold, wherein the first threshold is greater than or equal to 0, and wherein the second threshold is less than or equal to 0.

15. The method according to claim 13, wherein calculating the relative position relationship between the highest point and the lowest point according to the coordinates of the highest point and the coordinates of the lowest point, determining that the user executes the touch operation by the left hand when the highest point is located upper right to the lowest point, and determining that the user executes the touch operation by the right hand when the highest point of the touch area is located upper left to the lowest point, comprise:
calculating, using the coordinates of the highest point and the coordinates of the lowest point, a slope of a straight line on which the highest point and the lowest point are located;
determining that the user executes the touch operation by the left hand when the slope is greater than a third threshold; and
determining that the user executes the touch operation by the right hand when the slope is less than a fourth threshold, wherein the third threshold is greater than or equal to 0, and wherein the fourth threshold is less than or equal to 0.

16. The method according to claim 12, wherein the coordinates of the contact points sensed by the touchscreen comprise coordinates of a leftmost point of the touch area corresponding to the touch operation and coordinates of a rightmost point of the touch area corresponding to the touch operation, wherein calculating, by the handheld device, the relative position relationship between the contact points comprises calculating, by the handheld device, the relative position relationship between the leftmost point and the rightmost point according to the coordinates of the leftmost point and the coordinates of the rightmost point, wherein determining that the user executes the touch operation by the left hand comprises determining that the user executes the touch operation by the left hand when the leftmost point is below the rightmost point, and wherein determining that the user executes the touch operation by the right hand comprises determining that the user executes the touch operation by the right hand when the leftmost point of the touch area is above the rightmost point.

17. The method according to claim 16, wherein calculating the relative position relationship between the leftmost point and the rightmost point according to the coordinates of the leftmost point and the coordinates of the rightmost point, determining that the user executes the touch operation by the left hand when the leftmost point is below the rightmost point, and determining that the user executes the touch operation by the right hand when the leftmost point of the touch area is above the rightmost point, comprise:

acquiring a difference by subtracting a vertical coordinate value of the leftmost point from a vertical coordinate value of the rightmost point;

determining that the user executes the touch operation by the left hand when the difference is greater than a first threshold; and determining that the user executes the touch operation by the right hand when the difference is less than a second threshold, wherein the first threshold is greater than or equal to 0, and wherein the second threshold is less than or equal to 0.

18. The method according to claim 16, wherein calculating the relative position relationship between the leftmost point and the rightmost point according to the coordinates of the leftmost point and the coordinates of the rightmost point, determining that the user executes the touch operation by the left hand when the leftmost point is below the rightmost point, and determining that the user executes the touch operation by the right hand when the leftmost point of the touch area is above the rightmost point, comprise:

calculating, using the coordinates of the leftmost point and the coordinates of the rightmost point, a slope of a straight line on which the leftmost point and the rightmost point are located;

determining that the user executes the touch operation by the left hand when the slope is greater than a third threshold; and determining that the user executes the touch operation by the right hand when the slope is less than a fourth threshold, wherein the third threshold is greater than 0, and wherein the fourth threshold is less than or equal to 0.

19. The method according to claim 12, wherein before displaying, on the left side of the touchscreen, the input area that is currently displayed on the handheld device or displaying, on the right side of the touchscreen, the input area that is currently displayed on the handheld device, the method further comprises determining an application that is in an active state and that is on the handheld device, wherein displaying, on the left side of the touchscreen, the input area that is currently displayed on the handheld device comprises displaying, on the left side of the touchscreen, a currently displayed input area of the application in the active state, when a position of the currently displayed input area of the application in the active state is adjustable, and wherein displaying, on the right side of the touchscreen, the input area that is currently displayed on the handheld device comprises displaying, on the right side of the touchscreen, a currently displayed input area of the application in the active state, when a position of the currently displayed input area of the application in the active state is adjustable.

20. The method according to claim 12, wherein the input area is an input area of an input method application.

* * * * *